United States Patent
Wandner et al.

(10) Patent No.: US 11,485,853 B2
(45) Date of Patent: Nov. 1, 2022

(54) POLYCARBONATE COMPOSITION COMPRISING PEARLESCENT PIGMENT AND/OR INTERFERENCE PIGMENT

(71) Applicant: Covestro Deutschland AG, Leverkusen (DE)

(72) Inventors: Derk Erich Wandner, Odenthal (DE); Ingmar Hermsdorfer, Krefeld (DE); Christopher Schirwitz, Leverkusen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 62 days.

(21) Appl. No.: 16/608,324

(22) PCT Filed: Apr. 25, 2018

(86) PCT No.: PCT/EP2018/060619
§ 371 (c)(1),
(2) Date: Oct. 25, 2019

(87) PCT Pub. No.: WO2018/197572
PCT Pub. Date: Nov. 1, 2018

(65) Prior Publication Data
US 2021/0102062 A1    Apr. 8, 2021

(30) Foreign Application Priority Data

Apr. 28, 2017   (EP) ...................... 17168589

(51) Int. Cl.
| | |
|---|---|
| *C08L 69/00* | (2006.01) |
| *C08L 23/26* | (2006.01) |
| *C08K 3/34* | (2006.01) |
| *C08K 5/13* | (2006.01) |
| *C08K 5/524* | (2006.01) |
| *C08K 5/50* | (2006.01) |
| *C08K 3/22* | (2006.01) |

(52) U.S. Cl.
CPC .............. *C08L 69/00* (2013.01); *C08K 3/34* (2013.01); *C08K 5/13* (2013.01); *C08K 5/50* (2013.01); *C08K 5/524* (2013.01); *C08L 23/26* (2013.01); *C08K 2003/2241* (2013.01)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,365 A | 4/1962 | Schnell et al. |
| 3,148,172 A | 9/1964 | Fox |
| 3,271,367 A | 9/1966 | Schnell et al. |
| 3,761,440 A | 9/1973 | Margotte et al. |
| 3,879,348 A | 4/1975 | Serini et al. |
| 4,982,014 A | 1/1991 | Freitag et al. |
| 5,097,002 A | 3/1992 | Sakashita et al. |
| 5,288,778 A | 2/1994 | Schmitter et al. |
| 5,340,905 A | 8/1994 | Kühling et al. |
| 5,627,256 A | 5/1997 | Meier et al. |
| 5,717,057 A | 2/1998 | Sakashita et al. |
| 5,821,380 A | 10/1998 | Holderbaum et al. |
| 5,883,165 A | 3/1999 | Kröhnke et al. |
| 6,596,840 B1 | 7/2003 | Kratschmer et al. |
| 6,740,730 B1 | 5/2004 | Kratschmer et al. |
| 7,071,284 B2 | 7/2006 | Kauth et al. |
| 7,074,351 B2 | 7/2006 | Döbler et al. |
| 7,169,834 B2 | 1/2007 | Döbler et al. |
| 8,916,630 B2 | 12/2014 | Dern et al. |
| 2014/0243467 A1* | 8/2014 | Dern ....................... C08K 7/14 524/508 |
| 2015/0232644 A1* | 8/2015 | Ahlborn ................. C08K 5/101 524/91 |
| 2021/0379817 A1* | 12/2021 | Wandner ................ C08L 69/00 |

FOREIGN PATENT DOCUMENTS

| | | | |
|---|---|---|---|
| CN | 102627827 | * | 8/2012 |
| DE | 1570703 | A1 | 2/1970 |
| DE | 2036052 | A1 | 1/1972 |
| DE | 2063050 | A1 | 7/1972 |
| DE | 2105487 | A1 | 8/1972 |
| DE | 2211956 | A1 | 10/1973 |
| DE | 3832396 | A1 | 2/1990 |
| DE | 10006208 | A1 | 8/2001 |
| DE | 10022037 | A1 | 11/2001 |

(Continued)

OTHER PUBLICATIONS

Hanaor, Review of the Anatase to Rutile Phase Transformation; Journal Science (2011) 46 pp. 855-874. (Year: 2010).*
Iupilon Novarex Xantar brochure of Mitsubishi Engineering-Plastics; no date; pp. 1-18. (Year: 0000).*
Makrolon Product Range (Covestro) Mar. 2016; pp. 1-32. (Year: 2016).*
International Search Report for PCT/EP2018/060619 dated May 24, 2018.

*Primary Examiner* — David J Buttner

(74) *Attorney, Agent, or Firm* — Faegre Drinker Biddle & Reath LLP

(57) ABSTRACT

The invention relates to compositions based on aromatic polycarbonate comprising metal oxide-coated micas as effect pigment, which do not have any significant increase in molecular weight of the polycarbonate, as can be seen from the MVR, under thermal stress. This is achieved by the addition of small amounts of an anhydride-modified α-olefin polymer, optionally in combination with phosphorus-containing thermal stabilizer.

13 Claims, No Drawings

(56) References Cited

FOREIGN PATENT DOCUMENTS

| | | |
|---|---|---|
| EP | 0426499 A1 | 5/1991 |
| EP | 0500496 A1 | 8/1992 |
| EP | 0718354 A2 | 6/1996 |
| EP | 0839623 A1 | 5/1998 |
| EP | 1559743 A1 | 8/2005 |
| EP | 1865027 A1 | 12/2007 |
| FR | 1561518 A | 3/1969 |
| GB | 1122003 A | 7/1968 |
| GB | 1229482 A | 4/1971 |
| GB | 1367790 A | 9/1974 |
| JP | 54-027388 A | 3/1979 |
| JP | S6162039 A | 3/1986 |
| JP | S6162040 A | 3/1986 |
| JP | S61105550 A | 5/1986 |
| JP | 2007-191608 A | 8/2007 |
| JP | 2014-184729 A | 10/2014 |
| JP | 2015-096566 A | 12/2016 |
| WO | WO-9615102 A2 | 5/1996 |
| WO | WO-0105866 A1 | 1/2001 |
| WO | WO-0105867 A1 | 1/2001 |
| WO | WO-2004063249 A1 | 7/2004 |
| WO | WO 2011/134674 * | 11/2011 |
| WO | WO-2013045552 A1 | 4/2013 |

\* cited by examiner

POLYCARBONATE COMPOSITION COMPRISING PEARLESCENT PIGMENT AND/OR INTERFERENCE PIGMENT

CROSS-REFERENCE TO RELATED APPLICATIONS

This application is a national stage application (under 35 U.S.C. § 371) of PCT/EP2018/060619, filed Apr. 25, 2018, which claims benefit of European Application No. 17168589A, filed Apr. 28, 2017, both of which are incorporated herein by reference in their entirety.

The invention relates to polycarbonate compositions comprising interference pigment and/or pearlescent pigment from the group of the metal oxide-coated micas, and to mouldings made from these compositions.

Effect pigments are added to polycarbonate compositions in some cases in order to influence the appearance of the compositions by means of angle-dependent changes in hue and/or gloss. Effect pigments are platelet-shaped and bring about directed reflection and/or interference. There are various groups of effect pigments: metal effect pigments, interference pigments and pearlescent pigments, although the boundaries particularly between the latter can be fluid and these are therefore also referred to collectively as "special effect pigments".

Pearlescent pigments comprise transparent platelets having high refractive index. Multiple reflection gives rise to a pearl-like effect. Colouring in the case of interference pigments, which may be either transparent or opaque, is based primarily on interference.

The pearlescent pigments and/or interference pigments especially also include metal oxide-coated mica pigments, which are employed in various sectors, for instance for housings of numerous domestic appliances or consumer electronics devices or as a design element in the architectural sector. Pearlescent effect pigments and/or interference pigments of this kind are available inter alia under the "Magnapearl®" or "Mearlin®" names from BASF SE or under the "Iriodin®" or "Candurin®" names from Merck SE.

When used in polycarbonate compositions, pearlescent pigments or interference pigments from the group of the metal oxide-coated micas typically lead to significant degradation of the polycarbonate, which is manifested in a reduction in the molecular weight and an associated reduction in the viscosity and hence increase in the melt volume flow rate MVR and deterioration in the mechanical properties. The degradation processes also lead to discolouration of the material.

In the compositions available on the market, the degradation processes are taken into account in that the polycarbonate is used with higher molecular weight than required for the actual application. The target molecular weight is then attained via the compounding and injection moulding or extrusion processes at elevated temperature. Further parameters in the compounding process, such as the control of the energy input or the arrangement of the metering point for the effect pigment, also have a significant effect on the molecular weight of the polycarbonate that ultimately arises. However, it is found here that control of the molecular weight is problematic.

An option in principle for minimizing the degradation of polycarbonate is the use of thermal stabilizers. For thermal stabilization of polycarbonate, it is customary to add essentially suitable organic phosphorus compounds such as aromatic phosphines, aromatic phosphites and organic antioxidants, especially sterically hindered phenols. There are frequent descriptions of the use of phosphites in combination with sterically hindered phenols, for instance in EP 0 426 499 A1. However, in the case of the effect pigments described, stabilization by phosphites only is insufficient.

The problem addressed was thus that of providing polycarbonate compositions comprising pearlescent pigments and/or interference pigments from the group of the metal oxide-coated micas, which exhibit minimum degradation of the polycarbonate during the compounding, such that the above-described disadvantages are avoided as far as possible.

It has been found that, surprisingly, the problem is solved by addition of anhydride-modified α-olefin polymer (primary stabilizer), preferably in combination with a phosphorus-containing thermal stabilizer (secondary stabilizer), especially a thermal stabilizer mixture, to give a polycarbonate composition comprising pearlescent pigment(s) and/or interference pigment(s) from the group of the metal oxide-coated micas.

Compositions according to the invention are therefore those comprising
 A) 50 wt % to 98.5 wt % of aromatic polycarbonate, and
 B) 0.8 wt % to ≤3.0 wt % of interference pigment and/or pearlescent pigment from the group of the metal oxide-coated micas,
 characterized in that the composition also comprises
 C) 0.05 wt % to ≤3 wt % of anhydride-modified α-olefin polymer,
and preferably those compositions also comprising 0.001 wt % to 0.500 wt % of one or more thermal stabilizers.

Component A

Component A comprises aromatic polycarbonate. "Polycarbonate" is understood in accordance with the invention to mean both homopolycarbonates and copolycarbonates. These polycarbonates may be linear or branched in known fashion. According to the invention mixtures of polycarbonates may also be used.

A portion, up to 80 mol %, preferably of 20 mol % to 50 mol %, of the carbonate groups in the polycarbonates used in accordance with the invention may have been replaced by aromatic dicarboxylic ester groups. Polycarbonates of this type that incorporate not only acid radicals derived from carbonic acid but also acid radicals derived from aromatic dicarboxylic acids in the molecular chain are referred to as aromatic polyester carbonates. For the purposes of the present invention, they are covered by the umbrella term "thermoplastic aromatic polycarbonates".

Replacement of the carbonate groups by the aromatic dicarboxylic ester groups proceeds essentially stoichiometrically and also quantitatively and the molar ratio of the reaction partners is therefore also reflected in the final polyester carbonate. The aromatic dicarboxylic ester groups can be incorporated either randomly or blockwise.

The thermoplastic polycarbonates, including the thermoplastic aromatic polycarbonates, have average molecular weights $M_w$, determined by means of gel permeation chromatography according to DIN 55672-1:2007-08, calibrated against bisphenol A polycarbonate standards using dichloromethane as eluent, of 10 000 g/mol to 35000 g/mol, preferably of 12000 g/mol to 32000 g/mol, further preferably of 15 000 g/mol to 32 000 g/mol, especially of 20 000 g/mol to 31 500 g/mol, calibration with linear polycarbonates (formed from bisphenol A and phosgene) of known molar mass distribution from PSS Polymer Standards Service GmbH, Germany, and calibration according to method 2301-0257502-09D (2009 edition in German language)

from Currenta GmbH & Co. OHG, Leverkusen. The eluent is dichloromethane. Column combination of crosslinked styrene divinylbenzene resins. Diameter of analytical columns: 7.5 mm; length: 300 mm. Particle sizes of column material: 3 μm to 20 μm. Concentration of solutions: 0.2 wt %. Flow rate: 1.0 ml/min, temperature of solutions: 30° C. Detection using a refractive index (RI) detector.

Details of the production of polycarbonates have been set out in many patent specifications during the last approximately 40 years. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverné, BAYER AG, "Polycarbonates" in Encyclopedia of Polymer Science and Engineering, Volume 11, Second Edition, 1988, pages 648-718, and finally to U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

Preferred modes of production of the polycarbonates to be used according to the invention, inclusive of the polyester carbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

The production of aromatic polycarbonates is effected for example by reaction of dihydroxyaryl compounds with carbonic halides, preferably phosgene, and/or with aromatic dicarboxyl dihalides, preferably benzenedicarboxyl dihalides, by the interfacial process, optionally using chain terminators and optionally using trifunctional or more than trifunctional branching agents, production of the polyester carbonates being achieved by replacing a portion of the carbonic acid derivatives with aromatic dicarboxylic acids or derivatives of the dicarboxylic acids, specifically with aromatic dicarboxylic ester structural units according to the proportion of carbonate structural units to be replaced in the aromatic polycarbonates. Preparation via a melt polymerization process by reaction of dihydroxyaryl compounds with, for example, diphenyl carbonate is likewise possible.

Dihydroxyaryl compounds suitable for the preparation of polycarbonates are those of the formula (1)

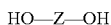 (1), in which
Z is an aromatic radical which has from 6 to 30 carbon atoms and may contain one or more aromatic rings, may be substituted and may contain aliphatic or cycloaliphatic radicals or alkylaryls or heteroatoms as bridging elements.

Z in formula (1) is preferably a radical of the formula (2)

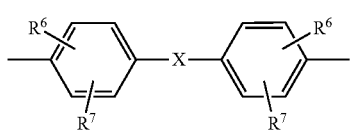 (2)

in which
$R^6$ and $R^7$ are each independently of one another H, $C_1$- to $C_{18}$-alkyl-, $C_1$- to $C_{18}$-alkoxy, halogen such as Cl or Br or respectively optionally substituted aryl- or aralkyl, preferably H or $C_1$- to $C_{12}$-alkyl, more preferably H or $C_1$- to $C_8$-alkyl and most preferably H or methyl, and X is a single bond, $-SO_2-$, $-CO-$, $-O-$, $-S-$, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else is $C_6$- to $C_{12}$-arylene, which may optionally be fused to other aromatic rings containing heteroatoms.

X is preferably a single bond, $C_1$- to $C_5$-alkylene, $C_2$- to $C_5$-alkylidene, $C_5$- to $C_6$-cycloalkylidene, $-O-$, $-SO-$, $-CO-$, $-S-$, $-SO_2-$ or is a radical of the formula (2a)

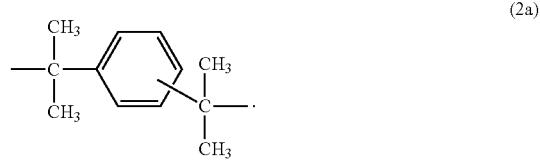 (2a)

Dihydroxyaryl compounds suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl)sulfides, bis(hydroxyphenyl)ethers, bis(hydroxyphenyl) ketones, bis(hydroxyphenyl) sulfones, bis(hydroxyphenyl) sulfoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred dihydroxyaryl compounds are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane and also the bisphenols (I) to (III)

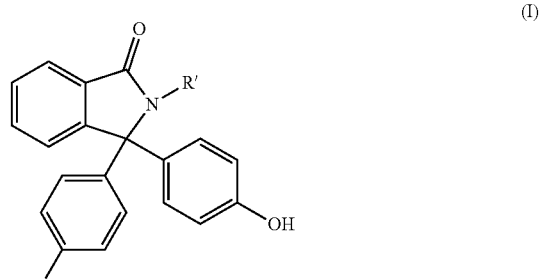 (I)

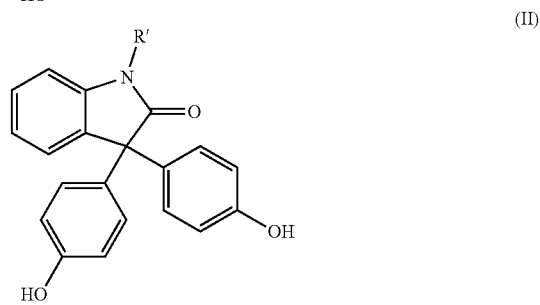 (II)

-continued

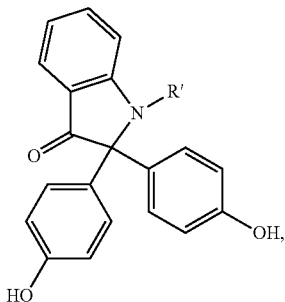
(III)

in which R' in each case is $C_1$- to $C_4$-alkyl, aralkyl or aryl, preferably methyl or phenyl, most preferably methyl.

Particularly preferred dihydroxyaryl compounds are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A and also the diphenols of formulae (I), (II) and (III).

These and other suitable dihydroxyaryl compounds are described for example in U.S. Pat. Nos. 3,028,635, 2,999,825, 3,148,172, 2,991,273, 3,271,367, 4,982,014 and 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one dihydroxyaryl compound is used; in the case of copolycarbonates two or more dihydroxyaryl compounds are used. The dihydroxyaryl compounds employed, similarly to all other chemicals and assistants added to the synthesis, may be contaminated with the contaminants from their own synthesis, handling and storage. However, it is desirable to use raw materials of the highest possible purity.

Suitable carbonic acid derivatives are for example phosgene and diphenyl carbonate.

Suitable chain terminators that may be used in the production of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by tert-butyl. Particularly preferred chain terminators are phenol, cumylphenol and/or p-tert-butylphenol.

The amount of chain terminator to be employed is preferably 0.1 to 5 mol % based on the moles of diphenols employed in each case. The chain terminators can be added before, during or after the reaction with a carbonic acid derivative.

Suitable branching agents are the trifunctional or more than trifunctional compounds known in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4''-dihydroxytriphenyl)methyl)benzene and 3,3-bis (3-methyl-4-hydroxyphenyl)-2-oxo-2,3-dihydroindole.

The amount of the branching agents for optional employment is preferably 0.05 mol % to 2.00 mol %, based on moles of dihydroxyaryl compounds used in each case.

The branching agents may be either initially charged together with the dihydroxyaryl compounds and the chain terminators in the aqueous alkaline phase or added dissolved in an organic solvent before the phosgenation. In the case of the transesterification process the branching agents are employed together with the dihydroxyaryl compounds.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane, and also homo- or copolycarbonates derived from the diphenols of formulae (I), (II) and/or (III)

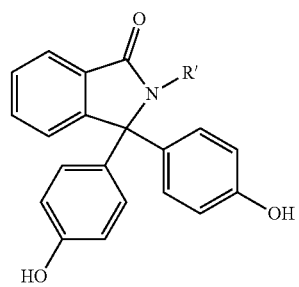
(I)

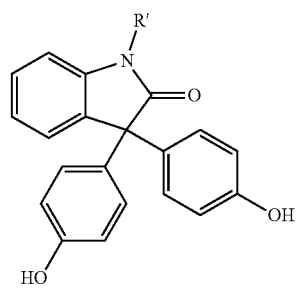
(II)

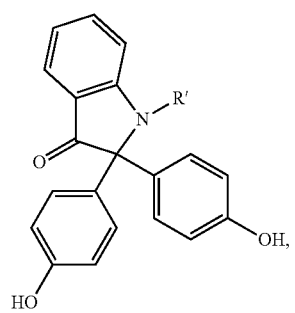
(III)

in which R' in each case is $C_1$- to $C_4$-alkyl, aralkyl or aryl,
preferably methyl or phenyl, most preferably methyl,
especially with bisphenol A.

To achieve incorporation of additives, component A is preferably used at least partly in the form of powders, pellets or mixtures of powders and pellets.

The polycarbonate preferably has an MVR of 5 to 20 cm/(10 min), further preferably of 5.5 to 12 cm/(10 min), determined according to ISO 1133:2012-03 at a testing temperature of 300° C. with a load of 1.2 kg.

The polycarbonate used may also be a mixture of different polycarbonates, for example of polycarbonates A1 and A2:

It is preferable when the amount of the aromatic polycarbonate A1 based on the total amount of polycarbonate is 25.0 to 85.0 wt %, preferably 28.0 to 84.0 wt %, more preferably 30.0 to 83.0 wt %, where this aromatic polycarbonate is based on bisphenol A and preferably has a melt volume flow rate MVR of 5 to 15 cm$^3$/10 min and further preferably has a melt volume flow rate MVR of 6 to 12 cm$^3$/10 min, determined to ISO 1133 (test temperature 300° C., mass 1.2 kg, DIN EN ISO 1133-1:2012-03).

It is preferable when the amount of the pulverulent aromatic polycarbonate A2 based on the total amount of polycarbonate is 2.0 to 12.0 wt %, preferably 3.0 to 11.0 wt %, more preferably 4.0 to 10.0 wt %, most preferably from 5.0 to 8.0 wt, where this aromatic polycarbonate is preferably based on bisphenol A and has a preferred melt volume flow rate MVR of 12 to 65 cm$^3$/10 min, further preferably has a melt volume flow rate MVR of 14 to 32 cm$^3$/10 min, and more preferably has a melt volume flow rate MVR of 15 to 20 cm$^3$/10 min.

Overall, 50 to 98.5 wt %, preferably 80 to 98.0 wt %, further preferably 85 to 97.5 wt %, more preferably 90.0 to 97.5 wt %, most preferably 93.0 wt % to 97.5 wt %, of aromatic polycarbonate is used in compositions according to the invention.

Component B

Component B of the compositions according to the invention comprises interference pigments and/or pearlescent pigments from the group of the metal oxide-coated micas. The mica may be naturally occurring or synthetically produced mica, the latter being preferable owing to its typically higher purity. The mica which is obtained from nature is typically accompanied by further minerals. The mica is preferably muscovite-based, meaning that it comprises preferably at least 60 wt %, further preferably at least 70 wt %, even further preferably at least 85 wt %, more preferably at least 90 wt %, of muscovite, based on the total weight of the mica component—without metal oxide coating—of the interference pigment and/or pearlescent pigment.

The metal oxide coating preferably comprises one or more coating layers comprising titanium dioxide, tin oxide, aluminium oxide and/or iron oxide, where the metal oxide is further preferably iron(III) oxide ($Fe_2O_3$), iron (II, III) oxide ($Fe_3O_4$, a mixture of $Fe_2O_3$ and FeO) and/or titanium dioxide, more preferably titanium dioxide. The metal oxide coating is thus most preferably a titanium dioxide coating.

The proportion of the titanium dioxide in the total weight of the pigment is preferably 30 to 60 wt %, even further preferably 35 to 55 wt %, and the proportion of the mica is preferably 40 to 70 wt %, even further preferably 45 to 65 wt %.

Preferred titanium dioxide is rutile and/or anatase. Preferably at least 90 wt %, further preferably at least 95 wt %, even further preferably at least 98 wt %, of pigment component B is anatase- and/or rutile-coated mica.

In order to increase the compatibility with the polymer matrix composed of polycarbonate, the pigment has preferably additionally been provided with a silicate coating, especially a sol-gel coating. "Silicate coating" is understood in accordance with the invention especially also to mean a coating composed of silicon dioxide. This typically simultaneously increases the weathering resistance and chemical stability of the pigment.

The median particle size (D50) of the pigment, determined by means of laser diffractometry on an aqueous slurry of the pigment, is preferably between 1 and 100 µm, in the case of synthetic mica further preferably between 5 and 80 µm and in the case of natural mica further preferably between 3 and 30 µm, generally in the case of mica more preferably between 3.5 and 15 µm, even more preferably 4.0 to 10 µm, exceptionally preferably 4.5 to 8.0 sm. The D90, likewise determined by means of laser diffractometry on an aqueous slurry of the pigment, in the case of synthetic mica is preferably from 10 to 150 µm and in the case of natural mica preferably from 5 to 80 sm. The density of the pigment is preferably 2.5 to 5.0 g/cm$^3$, further preferably 2.8 to 4.0 g/cm$^3$, determined according to DIN EN ISO 1183-1:2013-04.

The proportion of the at least one metal oxide-coated mica in the overall polycarbonate-based composition is 0.8 wt % to ≤3.0 wt %, preferably 1.0 wt % to 2.5 wt %, more preferably 1.2 wt % to 2.0 wt %.

Component C

Component C of the compositions according to the invention is an anhydride-modified α-olefin polymer.

The α-olefin polymer is preferably based on at least one monomer selected from the group consisting of ethylene, 1-propene, 1-butene, 1-isobutene, 1-pentene, 1-hexene, 1-heptene, 1-octene, 1-nonene, 1-decene, 1-undecene, 1-dodecene, I-tridecene, 1-tetradecene, 1-octadecene, 1-nonadecene, but may alternatively be based on mixtures of these monomers. Further preferably, the α-olefin polymer is based on at least one monomer selected from the group consisting of ethene, propene, 1-hexene, I-octene. More preferably, the α-olefin polymer is based on ethylene, propene and/or 1-octene.

"Based on" in this context means that preferably at least 90 wt %, further preferably at least 95 wt %, more preferably at least 98 wt %, based on the total weight of the respective α-olefin polymer in the polycarbonate-containing composition, of the α-olefin copolymer has been formed from the respective monomer(s).

The α-olefin polymer has been modified with an anhydride, using an unsaturated carboxylic anhydride for the modification. The carboxylic anhydride is preferably selected from the group consisting of maleic anhydride, phthalic anhydride, fumaric anhydride, itaconic anhydride and mixtures thereof. Particular preference is given to maleic anhydride.

The anhydride-modified α-olefin polymer is preferably free of styrene-butadiene rubber, most preferably rubber-free.

Further preferably, component C comprises
C1) 90.0-99.5 wt %, preferably 92.0-97.5 wt %, further preferably 94.0-97.0 wt %, of α-olefin polymer and
C2) 0.5-10.0 wt %, further preferably 2.5-8.0 wt %, even further preferably 3.0-6.0 wt %, of anhydride.

The olefinic portion C1) of the α-olefin polymer is most preferably characterized in that
the ethylene content is 65.0-96.0 wt %, further preferably 80.0-96.0 wt %, most preferably 84.0-92.0 wt %,
the propylene content is 2.0-10.0 wt %, most preferably 4.0-8.0 wt %, and
the 1-octene content is 2.0-25.0 wt %, further preferably 2.0-10.0 wt %, most preferably 4.0-8.0 wt %.

Most preferably, the α-olefin polymer is not based on any other monomers.

In an embodiment which is in accordance with the invention but is less preferred than a combination of ethene, propene and 1-octene, the olefinic portion C1) of the alpha-olefin polymer is based on propylene and/or ethylene, and in another embodiment on propylene only, most preferably to an extent of at least 98 wt %.

The average molecular weight $M_w$ of the anhydride-modified α-olefin polymer is preferably 300 to 40 000 g/mol, further preferably 800 to 32 000 g/mol, even further preferably 1000 to 15 000 g/mol, more preferably 1000 to 8000 g/mol, most preferably 3000 to 6000 g/mol. The molecular weight $M_w$ is determined by means of gel permeation chromatography in ortho-dichlorobenzene at 150° C. with polystyrene calibration. The value reported here is preferably the mean from a double determination.

The acid number of the anhydride-modified α-olefin polymer is preferably at least 30 mg KOH/g, further preferably 45 to 170 mg KOH/g, more preferably to 79 mg KOH/g, determined according to DIN ISO 17025:2005-08 by means of potentiometric titration with alcoholic potassium hydroxide solution.

Most preferably, the anhydride-modified α-olefin polymer of component C is based on ethene, propene and 1-octene, is maleic anhydride-modified, and further preferably has an average molecular weight $M_w$, determined by means of gel permeation chromatography in ortho-dichlorobenzene at 150° C. with polystyrene calibration, of 1000 to 8000 g/mol, even further preferably 3000 to 6000 g/mol, and an acid number of 45 to 170 mg KOH/g, determined according to DIN ISO 17025:2005-08 by means of potentiometric titration.

The amount of anhydride-modified α-olefin polymer in the overall composition is 0.05 wt % to ≤3 wt %, preferably 0.1 wt % to 2.0 wt %, further preferably 0.15 wt % to 1.5 wt %, more preferably 0.2 wt % to ≤1 wt %.

Component D

The compositions according to the invention preferably comprise at least one phosphorus-containing thermal stabilizer, further preferably a phosphine- and/or phosphite-containing thermal stabilizer. "Phosphorus-containing" here means that phosphorus is not present in some form as a mere impurity in component D, but that the structural formula of the thermal stabilizer includes a phosphorus atom.

Preferred compositions according to the invention comprise at least one phosphine-based stabilizer, at least one phosphite-based stabilizer and at least one stabilizer from the group of the phenolic antioxidants, which constitute a particularly good stabilizer combination.

Alternatively preferred compositions according to the invention comprise at least one phosphine-based stabilizer, at least one phosphonite-based, especially diphosphonite-based, stabilizer, and at least one stabilizer from the group of the phenolic antioxidants.

The compositions according to the invention preferably contain 0.001 to 0.500 wt %, preferably 0.05 wt % to 0.270 wt %, of one or more phosphorus-containing thermal stabilizers.

Phosphines in the context of the present invention derive from compounds of the general $P_nH_{n+2}$ type, especially from $PH_3$, where preferably all hydrogen atoms have been replaced by aliphatic and/or aromatic hydrocarbyl radicals, where the aromatic hydrocarbyl radicals may have further substituents, for example alkyl groups, in branched and/or unbranched form. The phosphines here may have one phosphorus atom or else multiple phosphorus atoms bridged via corresponding aliphatic and/or aromatic hydrocarbons.

Phosphites in the context of the present invention are understood to mean esters of phosphonic acid (often also referred to as phosphorous esters) having the general structure $P(OR)_3$ where R represents aliphatic and/or aromatic hydrocarbyl radicals, where the aromatic hydrocarbyl radicals may have further substituents, for example alkyl groups, in branched and/or unbranched form.

Phosphonates are understood to mean compounds derived from the basic structure $R-PO(OH)_2$ where R represents aliphatic and/or aromatic hydrocarbyl radicals, where the aromatic hydrocarbyl radicals may have further substituents, for example branched and/or unbranched alkyl groups. The OH groups of the basic structure may partly or fully have been esterified to give OR functionalities where R in turn represents aliphatic and/or aromatic hydrocarbyl radicals, where the aromatic hydrocarbyl radicals may have further substituents, for example alkyl groups, in branched and/or unbranched form, or may have been partly or fully deprotonated, where the negative overall charge is balanced by a corresponding counterion.

Phosphonites in the context of the present invention are understood to mean esters, especially diesters, of phosphonous acid of the $R-P(OR)_2$ type where R represents aliphatic and/or aromatic hydrocarbyl radicals, where the aromatic hydrocarbyl radicals may have further substituents, for example alkyl groups, in branched and/or unbranched form. The phosphonites here may have one phosphorus atom or else multiple phosphorus atoms bridged via corresponding aliphatic and/or aromatic hydrocarbons.

The R radicals in one compound may be the same or different in each case.

There are no restrictions with regard to the selection of the phosphines, the phosphine compounds preferably being selected from the group comprising aliphatic phosphines, aromatic phosphines and aliphatic-aromatic phosphines.

The phosphine compounds may be primary, secondary and tertiary phosphines. Particular preference is given to using tertiary phosphines, particular preference being given to aromatic phosphines and very particular preference to tertiary aromatic phosphines.

Preference is given to using triphenylphosphine (TPP), trialkylphenylphosphine, bisdiphenylphosphinoethane or a trinaphthylphosphine, among which very particular preference is given to triphenylphosphine (TPP), or mixtures of these phosphines.

In principle, it is possible to use mixtures of different phosphines.

The preparation and properties of phosphine compounds are known to those skilled in the art and are described, for example, in EP 0 718 354 A2 and "Ullmanns Enzyklopädie der Technischen Chemie" [Ullmann's Encyclopedia of Industrial Chemistry], 4th ed., vol. 18, p. 378-398 and Kirk-Othmer, 3rd ed., vol. 17, p. 527-534.

In respect of the use amount of the phosphine compound in the stabilizer mixture, it should be taken into account that the substance can be oxidized under particular processing conditions depending on temperature and residence time. The oxidized fraction is no longer available for stabilization. Therefore, the number of processing steps and the respective processing conditions should be taken into account. After thermal processing, the composition thus also always comprises particular amounts of oxidized phosphine, especially preferably triphenylphosphine oxide.

Preferably, the amount of phosphine stabilizer in the end product is >0.01 wt %, further preferably >0.02 wt %.

Preferably, 0.03 to 0.500 wt %, further preferably 0.04 to 0.07 wt %, of phosphines is added to the compositions according to the invention.

Available phosphite stabilizers that are suitable in the context of the present invention are, for example, Irgafos® 168 (tris(2,4-di-tert-butylphenyl) phosphite/CAS No. 31570-044), Irgafos® TPP (CAS No. 101-02-0), ADK PEP Stab 36 (CAS No. 80693-00-1) and Irgafos® TNPP (CAS No. 26523-784), particular preference being given to Irgafos® 168.

The group of antioxidants especially includes the sterically hindered phenols. Possible sterically hindered phenols are, for example, n-octadecyl 3-(3,5-di-t-butyl-4-hydroxyphenyl)propionate or esters of β-(5-tert-butyl-4-hydroxy-3-methylphenyl)propionic acid or β-(3,5-dicyclohexyl-4-hydroxyphenyl)propionic acid with mono- or polyhydric alcohols, for example with methanol, ethanol, butanol, n-octanol, i-octanol, n-octadecanol, hexane-1,6-diol, nonane-1,9-diol, ethylene glycol, propane-1,2-diol, neopentyl glycol, diethylene glycol, triethylene glycol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Particularly suitably, the sterically hindered phenol used is n-octadecyl 3-(3,5-di-t-butyl-4-hydroxyphenyl)propionate. The sterically hindered phenol is preferably used in amounts of 0.01 to 0.1 wt %, preferably 0.015 to 0.06 wt %, based on the total weight of the composition.

Commercially available suitable phenolic antioxidants are, for example, Irganox® 1076 (CAS No. 2082-79-3/2,6-di-tert-butyl-4-(octadecanoxycarbonylethyl)phenol) and Irganox® 1010 (CAS No. 6683-19-8).

The stabilizer combination preferably comprises
a) 10 wt %-89 wt %, further preferably 20 wt %-78 wt %, and more preferably 30 wt %-67 wt %, of at least one phosphine stabilizer,
b) 10 wt %-89 wt %, further preferably 20 wt %-78 wt %, and more preferably 30 wt %-67 wt %, of at least one phosphite stabilizer, and
c) 1 wt %-50 wt %, further preferably 2 wt %-40 wt %, and more preferably 3 wt %-20 wt %, of at least one phenolic antioxidant,
where the sum total of components a)-c) adds up to 100% by weight.

In a particularly preferred embodiment, the stabilizer combination consists of triphenylphosphine, Irganox 1076® and bis(2,6-di-t-butyl-4-methylphenyl)pentaerythrityl diphosphite or of triphenylphosphine, Irganox 1076® and Hostanox® P-EPQ®, which comprises a diphosphonite as the main component.

As an alternative to Irganox 1076®, it is possible to use Irganox® 1010 (pentaerythritol 3-(4-hydroxy-3,5-di-tert-butylphenyl)propionate; CAS No.: 6683-19-8).

The proportion of the stabilizer combination in the overall composition is 0.001 wt %-0.500 wt %, preferably 0.005 wt %-0.300 wt %, further preferably 0.05 to 0.270 wt %, more preferably 0.15 wt %-0.25 wt %, based on the total weight of the composition.

In a preferred embodiment, the ratio of phosphite stabilizer to phenolic antioxidant is from 1:5 to 10:1, further preferably from 1:5 to 5:1 and more preferably 4:1.

In a further preferred embodiment, the ratio of phosphine (a) to the mixture of phosphite and phenolic antioxidant (b+c) is preferably 8:1 to 1:9, further preferably 1:5 to 5:1, where the ratio of phosphite stabilizer (b) to phenolic antioxidant (c) is from 1:5 to 10:1, further preferably from 1:5 to 5:1 and more preferably 4:1.

In order to stabilize the thermoplastic matrix, it is possible to use further phosphorus-based stabilizers, provided that they do not adversely affect the above-described stabilization.

Component E

One or more of the additives that are customary for polycarbonate compositions may also be added as further additives to the compositions comprising aromatic polycarbonate, such as flame retardants, anti-dripping agents, impact modifiers, fillers, antistats, colourants, pigments other than component B, also including carbon black, thermal stabilizers other than component D, lubricants and/or demoulding agents, UV absorbers, IR absorbers, hydrolysis stabilizers and/or compatibilizers. The group of the further additives does not include any pigments according to component B, i.e. any pearlescent pigments and/or interference pigments from the group of the metal oxide-coated micas, or any anhydride-modified α-olefin polymers, since these are designated as component C. The group of the further additives of component E also does not comprise any phosphorus-containing thermal stabilizers, since these are already covered by the optionally present component D.

The amount of further additives is preferably up to 10 wt %, further preferably up to 5 wt %, more preferably 0.01 to 3 wt %, most preferably up to 1 wt %, based on the overall composition.

Particularly suitable demoulding agents for the compositions according to the invention are pentaerythritol tetrastearate (PETS) or glycerol monostearate (GMS), carbonates thereof and/or mixtures of these demoulding agents.

Colourants or pigments in the context of the present invention of component E are, for example, sulfur-containing pigments such as cadmium red and cadmium yellow, iron cyanide-based pigments such as Prussian blue, oxide pigments such as titanium dioxide, zinc oxide, red iron oxide, black iron oxide, chromium oxide, titanium yellow, zinc/iron-based brown, titanium/cobalt-based green, cobalt blue, copper/chromium-based black and copper/iron-based black or chromium-based pigments such as chromium yellow, phthalocyanine-derived dyes such as copper phthalocyanine blue and copper phthalocyanine green, fused polycyclic dyes and pigments such as azo-based (e.g. nickel azo yellow), sulfur indigo dyes, perinone-based, perylene-based, quinacridone-derived, dioxazine-based, isoindolinone-based and quinophthalone-derived derivatives, anthraquinone-based heterocyclic systems, but in any case no pearlescent pigments and/or interference pigments from the group of the metal oxide-coated micas.

Specific examples of commercial products are, for example, MACROLEX® Blue RR, MACROLEX® Violet 3R, MACROLEX® EG, MACROLEX® Violet B (Lanxess AG, Germany), Sumiplast® Violet RR, Sumiplast® Violet B, Sumiplast® Blue OR, (Sumitomo Chemical Co., Ltd.), Diaresin® Violet D, Diaresin® Blue G, Diaresin® Blue N (Mitsubishi Chemical Corporation), Heliogen® Blue or Heliogen® Green (BASF AG, Germany).

Among these, preference is given to cyanine derivatives, quinoline derivatives, anthraquinone derivatives, phthalocyanine derivatives.

Carbon blacks used preferably include nanoscale carbon blacks, further preferably nanoscale pigment blacks. These preferably have an average primary particle size, determined by scanning electron microscopy, of less than 100 nm, preferably of 10 to 99 nm, further preferably of 10 to 50 nm, more preferably of 10 to 30 nm, especially of 10 to 20 nm. The finely divided pigment blacks are particularly preferred.

Commercially available carbon blacks that are suitable in the context of the invention are obtainable in a multitude of trade names and forms, such as pellets or powders. For instance, suitable carbon blacks are available under the BLACK PEARLS® trade names, as wet-processed pellets under the ELFTEX®, REGAL® and CSX® names, and in a flaky form as MONARCH®, ELFTEX®, REGAL® and MOGUL®, all from Cabot Corporation. Especially preferred are carbon blacks that are traded under the BLACK PEARLS® trade name (CAS No. 1333-86-4).

Optionally, the composition comprises an ultraviolet absorber. Suitable UV absorbers are compounds having the lowest possible transmittance below 400 nm and the highest possible transmittance above 400 nm. Such compounds and the production thereof are known from the literature and are described for example in EP 0 839 623 A1, WO 1996/15102 A2 and EP 0 500 496 A1. Ultraviolet absorbers particularly suitable for use in the composition according to the invention are benzotriazoles, triazines, benzophenones and/or arylated cyanoacrylates.

The following ultraviolet absorbers are suitable for example: hydroxybenzotriazoles, such as 2-(3',5'-bis(1,1-dimethylbenzyl)-2'-hydroxyphenyl)benzotriazole (Tinuvin® 234, BASF AG, Ludwigshafen), 2-(2'-hydroxy-5'-(tert-octyl)phenyl)benzotriazole (Tinuvin® 329, BASF AG, Ludwigshafen), 2-(2'-hydroxy-3'-(2-butyl)-5'-(tert-butyl) phenyl)benzotriazole (Tinuvin® 350, BASF AG, Ludwigshafen), bis(3-(2H-benzotriazolyl)-2-hydroxy-5-tert-octyl)methane, (Tinuvin® 360, BASF AG, Ludwigshafen), (2-(4,6-diphenyl-1,3,5-triazin-2-yl)-5-(hexyloxy)phenol (Tinuvin® 1577, BASF AG, Ludwigshafen), the benzophenones 2,4-dihydroxybenzophenone (Chimasorb® 22, BASF AG, Ludwigshafen) or 2-hydroxy-4-(octyloxy)benzophenone (Chimassorb® 81, BASF AG, Ludwigshafen), 2-cyano-3,3-diphenyl-2-propenoic acid, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, BASF AG, Ludwigshafen) or tetraethyl 2,2'-(1,4-phenylenedimethylidene)bismalonate (Hostavin® B-Cap, Clariant AG). It is also possible to use mixtures of these ultraviolet absorbers.

Suitable IR absorbers are disclosed, for example, in EP 1 559 743 A1, EP 1 865 027 A1, DE 10 022 037 A1 and DE 10 006 208 A1. Of the IR absorbers mentioned in the literature cited, preference is given to those based on boride and tungstate, especially caesium tungstate or zinc-doped caesium tungstate, and also ITO- and ATO-based absorbers and combinations thereof.

Impact modifiers present may be standard impact modifiers. This group comprises both core/shell-based systems such as ABS, MBS, acrylic-based, silicone/acrylic-based impact modifiers, but also non-core/shell-based impact modifiers.

It is possible to add organic and inorganic fillers to the polycarbonate composition in customary amounts. Useful materials in principle for this purpose include all finely ground organic and inorganic materials. These may, for example, be of particulate, flaky or fibrous character. Examples of these include chalk, quartz powder, titanium dioxide, silicates/aluminosilicates, for example talc, wollastonite, montmorillonite, especially also in an organophilic form modified by ion exchange, kaolin, zeolites, vermiculite, and also aluminium oxide, silica, magnesium hydroxide and aluminium hydroxide. It is also possible to use mixtures of different inorganic materials.

Preferred inorganic fillers are ultrafinely divided (nanoscale) inorganic compounds composed of one or more metals of main groups 1 to 5 and transition groups 1 to 8 of the Periodic Table, preferably from main groups 2 to 5, more preferably of main groups 3 to 5, or of transition groups 4 to 8, comprising the elements oxygen, sulfur, boron, phosphorus, carbon, nitrogen, hydrogen and/or silicon.

Preferred compounds are, for example, oxides, hydroxides, water-containing/basic oxides, sulfates, sulfites, sulfides, carbonates, carbides, nitrates, nitrites, nitrides, borates, silicates, phosphates and/or hydrides.

The anti-dripping agent used is preferably polytetrafluoroethylene (PTFE).

Compositions particularly preferred in accordance with the invention are those comprising
A) 90.0 wt % to 97.5 wt %, preferably 93.0 wt % to 97.5 wt %, of aromatic polycarbonate, preferably having an MVR of 5 to 20 cm$^3$/(10 min), determined to ISO 1133:2012-03 at a testing temperature of 300° C. with a load of 1.2 kg,
B) 1.0 to 2.5 wt %, preferably 1.2 to 2.0 wt %, pearlescent pigment and/or interference pigment from the group of the titanium dioxide-coated micas, more preferably comprising at least 98 wt % of anatase-coated mica,
C) 0.1 wt % to 2.0 wt % of anhydride-modified α-olefin polymer, preferably based on ethene, propene and/or 1-octene, more preferably maleic anhydride-modified,
D) 0.001 wt % to 0.500 wt %, preferably 0.05 to 0.270 wt %, of one or more phosphorus-containing thermal stabilizers, preferably comprising
  i) phosphine, phosphite and phenolic antioxidant or
  ii) phosphine, phosphonite and phenolic antioxidant,
E) up to 7 wt %, preferably up to 5 wt %, more preferably 0.1 to 3 wt %, most preferably up to 1 wt %, of further additives, exceptionally preferably selected from the group consisting of flame retardants, anti-dripping agents, impact modifiers, fillers, antistats, colourants, pigments other than component B, also including carbon black, thermal stabilizers other than component D, lubricants and/or demoulding agents, hydrolysis stabilizers, compatibilizers, UV absorbers and/or IR absorbers.

According to the invention, "up to" in each case encompasses the value that follows these words as the upper limit.

The group of further additives according to component E most preferably consists solely of colourants, demoulding agents, pigments other than component B, especially carbon black, and/or thermal stabilizers other than component D.

Compositions most preferred in accordance with the invention comprise
A) 90.0 wt % to 97.5 wt % of aromatic polycarbonate, preferably having an MVR of 5 to 12 cm$^3$/(10 min), determined to ISO 1133:2012-03 at a testing temperature of 300° C. with a load of 1.2 kg,
B) 1.2 to 2.0 wt %, preferably 1.5 to 2.0 wt %, pearlescent pigment and/or interference pigment from the group of the titanium dioxide-coated micas, exceptionally preferably comprising at least 98 wt % of anatase-coated mica,
C) 0.2 wt % to ≤1 wt % of anhydride-modified α-olefin polymer based on ethene, propene and 1-octene, more preferably maleic anhydride-modified, exceptionally preferably with an $M_w$ of 3000 g/mol to 6000 g/mol, determined by means of gel permeation chromatography in ortho-dichlorobenzene at 150° C. with polystyrene calibration,
D) 0.05 wt % to 0.270 wt %, exceptionally preferably 0.15 wt % to 0.25 wt %, of one or more phosphorus-containing thermal stabilizers comprising, exceptionally preferably consisting of,
  i) phosphine, phosphite and phenolic antioxidant or
  ii) phosphine, phosphonite and phenolic antioxidant
E) up to 7 wt %, preferably up to 3 wt %, exceptionally preferably up to 1 wt %, of further additives, exceptionally preferably selected from the group consisting of colourants, lubricants, demoulding agents, pigments other than component B, especially carbon black, and/or thermal stabilizers other than component D.

Exceptionally preferably, the compositions do not comprise any further components.

The polymer compositions according to the invention which comprise the abovementioned components are produced by commonplace methods of incorporation, by combining, mixing and homogenizing the individual constituents, the homogenization in particular preferably taking place in the melt by application of shear forces. Combination and mixing is optionally effected prior to melt homogenization using powder premixes.

It is also possible to use premixes of pellets or pellets and powders with the additives according to the invention.

It is also possible to use premixes produced from solutions of the mixture components in suitable solvents where homogenization is optionally effected in solution and the solvent is then removed.

In this case in particular, the components and aforementioned additives of the compositions according to the invention can be introduced by known processes or as a masterbatch.

The use of masterbatches is especially preferred for introduction of the additives, in which case masterbatches based on the respective polymer matrix in particular are used.

In this context, the composition can be combined, mixed, homogenized and then extruded in standard apparatuses such as screw extruders (for example twin-screw extruders (TSE)), kneaders or Brabender or Banbury mills. The extrudate can be cooled and comminuted after extrusion. It is also possible to premix individual components and then to add the remaining starting materials individually and/or likewise in a mixture.

The polymer mouldings can be produced from the compositions according to the invention preferably by injection moulding, extrusion or rapid heat cycle moulding.

The compositions according to the invention are preferably used for the production of injection mouldings, especially those having thin walls, with a pearlescent look. Likewise preferably, the compositions according to the invention are used for the production of extrudates. Injection mouldings and extrudates are understood in accordance with the invention to be "mouldings".

"Thin-walled" mouldings in the context of the present invention are those where there are wall thicknesses at the thinnest points of less than approximately 3 mm, preferably less than 3 mm, further preferably of less than 2.5 mm, even further preferably of less than 1.5 mm, more preferably of less than 0.5 mm. "Approximately" here means that the actual value does not substantially deviate from the stated value, wherein a deviation of not more than 25%, preferably not more than 10%, is deemed as "not substantial". The invention therefore also provides corresponding mouldings comprising or consisting of these compositions, referred to collectively as "mouldings formed from these compositions".

These polymer mouldings consisting of or comprising the compositions according to the invention likewise form part of the subject-matter of the present invention.

EXAMPLES

A: Makrolon® 3108 powder from Covestro Deutschland AG. Linear polycarbonate based on bisphenol A having a melt volume flow rate MVR of 6 cm$^3$/(10 min) (as per ISO 1133:2012-03, at a testing temperature of 300° C. with a load of 1.2 kg).

B-1: Pearlescent pigment. Anatase-coated mica Mearlin® Magnapearl® 3000 from BASF SE.

B-2: Mearlin® Magnapearl® 1100 pearlescent pigment. Rutile-coated mica; manufacturer: BASF SE.

B-3: Mearlin® Magnapearl® 2300 pearlescent pigment. Rutile-coated mica; manufacturer: BASF SE.

B-4: Iriodin® 119 Way pearlescent pigment. Rutile-coated mica; manufacturer: Merck KGaA.

B-5: Pyrisma® M30-58 Ambercup Orange. Pearlescent pigment $TiO_2$— and $Fe_2O_3$-coated mica; manufacturer Merck.

B-6: Iriodin® 119 Polar White. Rutile-coated mica; manufacturer: Merck KGaA.

C-1: Maleic anhydride-modified ethylene-propylene-octene terpolymer (ethylene:propylene:1-octene 70:8:22), CAS No. 31069-12-2, with molecular weight (gel permeation chromatography in ortho-dichlorobenzene at 150° C. with polystyrene calibration) $M_w$=4900 g/mol, $M_n$=1159 g/mol, density 940 kg/m$^3$, acid number 53 mg KOH/g, maleic anhydride content 4.5 wt %, based on the total weight of component C. The parameters stated ($M_n$ analogously to $M_w$) were determined as described in the general part of the description.

C-2: AC 907P. Maleic anhydride-modified polypropylene from Honeywell.

D-1: ADK STAB® PEP-36, bis(2,6-di-t-butyl-4-methylphenyl)pentaerythritol diphosphite, available from Adeka Palmarole.

D-2: Hostanox PEPQ. Stabilizer mixture, comprising tetrakis(2,4-di-tert-butylphenyl)-4,4'-biphenyl diphosphonite as the main component, available from Clariant.

D-3: Irganox® 1076, n-octadecyl 3-(3,5-di-t-butyl-4-hydroxyphenyl)propionate, available from BASF SE.

D-4: Irganox® B900, mixture of four parts Irgafos® 168 and one part Irganox® 1076. Irgafos® 168: tris(2,4-tert-butylphenyl) phosphite, available from BASF SE.

D-5: triphenylphosphine, available from BASF SE.

E1: pentaerythritol tetrastearate; Loxiol VPG 861 from Emery Oleochemicals.

E-2: mixture of standard colourants and carbon black.

The polycarbonate compositions described in the examples which follow in Tables I to 3 were produced by compounding in an Evolum EV32 extruder from Clextral with a throughput of 50 kg/h. The melt temperature was 300° C. Table 3 cites examples in which process parameters were varied.

Melt volume flow rate (MVR) was determined according to ISO 1133:2012-03 (at a testing temperature of 300° C., mass 1.2 kg) using the Zwick 4106 instrument from Zwick Roell. The MVR relates to the value after heating for one minute plus holding at temperature for four minutes; the IMVR is the value after heating for one minute plus holding at temperature for 19 minutes.

TABLE 1

Compositions and MVR

|   | 1V [wt %] | 2V [wt %] | 3V [wt %] | 4V [wt %] | 5V [wt %] | 6E [wt %] | 7E [wt %] |
|---|---|---|---|---|---|---|---|
| A | 97.48 | 97.38 | 97.28 | 97.38 | 97.28 | 97.28 | 97.38 |
| B-1 | 1.94 | 1.94 | 1.94 | 1.94 | 1.94 | 1.94 | 1.94 |
| C-1 |  |  |  |  |  | 0.4 | 0.4 |
| D-1 |  | 0.08 | 0.16 |  |  | 0.16 |  |
| D-2 |  |  |  | 0.08 | 0.16 |  | 0.08 |
| D-3 |  | 0.02 | 0.04 | 0.02 | 0.04 | 0.024 | 0.02 |
| D-4 |  |  |  |  |  |  |  |
| D-5 | 0.05 | 0.05 | 0.05 | 0.05 | 0.05 | 0.05 | 0.05 |
| E-1 | 0.4 | 0.4 | 0.4 | 0.4 | 0.4 |  |  |
| E-2 | 0.13 | 0.13 | 0.13 | 0.13 | 0.13 | 0.13 | 0.13 |
| MVR [cm³/(10 mins)] | 12.74 | 11.57 | 9.72 | 12.64 | 12.09 | 7.92 | 7.65 |

|   | 8E [wt %] | 9V [wt %] | 10V [wt %] | 11E [wt %] | 12E [wt %] | 13V [wt %] | 14V [wt %] |
|---|---|---|---|---|---|---|---|
| A | 97.28 | 97.38 | 97.28 | 97.38 | 97.28 | 97.48 | 97.48 |
| B-1 | 1.94 | 1.94 | 1.94 | 1.94 | 1.94 | 1.94 | 1.94 |
| C-1 | 0.4 |  |  | 0.4 | 0.4 |  |  |
| D-1 |  |  |  |  |  |  |  |
| D-2 | 0.16 |  |  |  |  |  |  |
| D-3 | 0.04 |  |  |  |  |  |  |
| D-4 |  | 0.1 | 0.2 | 0.1 | 0.2 |  |  |
| D-5 | 0.05 | 0.05 | 0.05 | 0.05 | 0.05 | 0.05 | 0.05 |
| E-1 |  | 0.4 | 0.4 |  |  | 0.4 | 0.4 |
| E-2 | 0.13 | 0.13 | 0.13 | 0.13 | 0.13 | 0.13 | 0.13 |
| MVR [cm³/(10 mins)] | 7.93 | 12.57 | 14.21 | 7.57 | 7.51 | 11.78 | 17.83 |

TABLE 2

Compositions and properties

|   | 15V [wt %] | 16 [wt %] | 17 [wt %] | 18 [wt %] | 19 [wt %] | 20 [wt %] |
|---|---|---|---|---|---|---|
| A1 | 97.51 | 97.41 | 97.41 | 97.51 | 97.61 | 97.01 |
| B-1 | 1.94 | 1.94 | 1.94 | 1.94 | 1.94 | 1.94 |
| B-2 |  |  |  |  |  |  |
| B-3 |  |  |  |  |  |  |
| C-1 |  | 0.4 |  |  |  | 0.8 |
| C-2 |  |  | 0.4 | 0.3 | 0.2 |  |
| D-1 |  | 0.08 | 0.08 | 0.08 | 0.08 | 0.08 |
| D-3 |  | 0.02 | 0.02 | 0.02 | 0.02 | 0.02 |
| E-1 | 0.4 |  |  |  |  |  |
| E-2 | 0.15 | 0.15 | 0.15 | 0.15 | 0.15 | 0.15 |
| Properties |  |  |  |  |  |  |
| MVR [cm³/(10 min)] | 12.5 | 7.0 | 6.7 | 6.9 | 7.0 | 7.1 |
| IMVR [cm³(10 min)] | 17.5 | 7.8 | 7.1 | 6.7 | 7.1 | 7.0 |
| Charpy notched impact (ISO 179/1eA) [kJ/m²] |  |  |  |  |  |  |
| Number of tough/brittle/unbroken | 0/9/0 | 5/5/0 |  |  |  | 10/0/0 |
| Average of tough/brittle (kJ/m²) | 0/15 | 48/27 |  |  |  | 53/0 |

|   | 21 [wt %] | 22 [wt %] | 23V [wt %] | 24 [wt %] | 25V [wt %] | 26 [wt %] |
|---|---|---|---|---|---|---|
| A1 | 98.35 | 95.95 | 97.51 | 97.41 | 97.51 | 97.41 |
| B-1 | 1.0 | 3.0 |  |  |  |  |
| B-2 |  |  | 1.94 | 1.94 |  |  |
| B-3 |  |  |  |  | 1.94 | 1.94 |
| C-1 | 0.4 | 0.8 |  | 0.4 |  | 0.4 |
| C-2 |  |  |  |  |  |  |
| D-1 | 0.08 | 0.08 |  | 0.08 |  | 0.08 |
| D-3 | 0.02 | 0.02 |  | 0.02 |  | 0.02 |
| E-1 |  |  | 0.4 |  | 0.4 |  |
| E-2 | 0.15 | 0.15 | 0.15 | 0.15 | 0.15 | 0.15 |

TABLE 2-continued

Compositions and properties

Properties

| | | | | | | |
|---|---|---|---|---|---|---|
| MVR [cm³/(10 min)] | 6.9 | 7.0 | 14.6 | 6.6 | 12.7 | 6.6 |
| IMVR [cm³(10 min)] | 7.0 | 7.1 | 16.0 | 6.9 | 16.3 | 7.0 |
| Charpy notched impact (ISO 179/1eA) [kJ/m²] | | | | | | |
| Number of tough/brittle/unbroken | | | 0/10/0 | 4/6/0 | | |
| Average of tough/brittle (kJ/m²) | | | 0/14 | 36/24 | | |

| | 27 V [wt %] | 28 [wt %] | 29 V [wt %] | 30 [wt %] | 31 V [wt %] | 32 [wt %] |
|---|---|---|---|---|---|---|
| A1 | 97.51 | 97.41 | 97.51 | 97.41 | 97.51 | 97.41 |
| B-4 | 1.94 | 1.94 | | | | |
| B-5 | | | 1.94 | 1.94 | | |
| B-6 | | | | | 1.94 | 1.94 |
| C-1 | | 0.4 | | 0.4 | | 0.4 |
| D-1 | | 0.08 | | 0.08 | | 0.08 |
| D-3 | | 0.02 | | 0.02 | | 0.02 |
| E-1 | 0.4 | | 0.4 | | 0.4 | |
| E-2 | 0.15 | 0.15 | 0.15 | 0.15 | 0.15 | 0.15 |
| Properties | | | | | | |
| MVR [cm³/(10 min)] | 10.0 | 6.6 | 10.7 | 7.1 | 20.2 | 7.0 |
| IMVR [cm³/(10 min)] | 11.6 | 6.8 | 14.7 | 7.5 | 20.4 | 7.2 |
| Charpy notched impact (ISO 179/1eA) | | | | | | |
| Number of tough/brittle/unbroken | 0/10/0 | 6/3/0 | 0/10/0 | 0/9/0 | 0/10/0 | 9/0/0 |
| Average of tough/brittle [kJ/m²] | 0/15 | 55/25 | 0/16 | 0/24 | 0/14 | 43/0 |

It is apparent from the comparative tests (15V, 23V, 25V) without component C, compared to the analogous inventive tests with component C (Examples 16-22, 24, 26), that the addition of anhydride-modified α-olefin polymer leads to a significant reduction in the pigment-induced degradation of the polycarbonate.
Significant stabilization of the polycarbonate by anhydride-modified α-olefin polymer also occurs in the case of micas coated by different metal oxide than titanium dioxide, here with titanium dioxide/iron oxide-coated mica (Example 30 compared to 29V), but the stabilizing effect here seems to be slightly worsened compared to those compositions comprising titanium dioxide-coated micas as pigment.

TABLE 3

Dependence on the process parameters.

| | 33V [wt %] | 34V [wt %] | 35V [wt %] | 36V [wt %] | 37 [wt %] | 38 [wt %] | 39 [wt %] | 40 [wt %] |
|---|---|---|---|---|---|---|---|---|
| A1 | 97.51 | 97.51 | 97.51 | 97.51 | 97.41 | 97.41 | 97.41 | 97.41 |
| B-1 | 1.94 | 1.94 | 1.94 | 1.94 | 1.94 | 1.94 | 1.94 | 1.94 |
| C-1 | | | | | 0.4 | 0.4 | 0.4 | 0.4 |
| D-1 | | | | | 0.08 | 0.08 | 0.08 | 0.08 |
| D-3 | | | | | 0.02 | 0.02 | 0.02 | 0.02 |
| E-1 | 0.4 | 0.4 | 0.4 | 0.4 | | | | |
| E-2 | 0.15 | 0.15 | 0.15 | 0.15 | 0.15 | 0.15 | 0.15 | 0.15 |
| Machine parameters | | | | | | | | |
| Temperature (° C.) | 280 | 280 | 300 | 300 | 280 | 280 | 300 | 300 |
| Speed (rpm) | 300 | 600 | 300 | 600 | 300 | 600 | 300 | 600 |
| Properties | | | | | | | | |
| MVR [cm³/(10 min)] | 17.2 | 26.6 | 16.8 | 25.5 | 6.5 | 6.7 | 6.5 | 6.6 |
| IMVR [cm³/(10 min)] | 19.7 | 28.3 | 19.1 | 27.4 | 7.1 | 7.2 | 6.7 | 7.2 |
| Charpy notched impact (ISO 179/1eA) | | | | | | | | |
| Number of tough/brittle/unbroken | 0/10/0 | 0/10/0 | 0/10/0 | 0/9/0 | 10/0/0 | 9/0/0 | 9/0/0 | 10/0/0 |
| Average of tough/brittle [kJ/m²] | 0/13 | 0/10 | 0/12 | 0/11 | 81/0 | 82/0 | 79/0 | 81/0 |

The results in Table 3 show that the effect of stabilization also occurs in the case of "harder" process conditions. Neither an increase in temperature by 20° C. nor twice as high a speed has any adverse effect on flowability in the case of stabilization; significant polymer degradation can thus be avoided in all the cases examined (tests 37 to 40). Without component C, however, (experiments 33V to 36V), there is significant polymer degradation, especially at elevated speeds (experiments 34V, 36V), as apparent from the higher MVR values and the poorer mechanical properties.

The invention claimed is:

1. A composition comprising
   A) 50 wt % to 98.5 wt % of aromatic polycarbonate, having melt volume flow rate (MVR) of from 5 to 20 cm$^3$/(10 min) determined according to ISO 1133:2012-03 at a testing temperature of 300° C. with a load of 1.2 kg,
   B) 0.8 wt % to ≤3.0 wt % of interference pigment and/or pearlescent pigment comprising a titanium dioxide-coated mica;
   C) 0.05 wt % to ≤3 wt % of anhydride-modified α-olefin polymer, wherein the olefinic portion of the anhydride-modified α-olefin polymer has
   an ethylene content of 65.0-96.0 wt %,
   a propylene content of 2.0-10.0 wt % and
   a 1-octene content of 2.0-25.0 wt % and
   D) 0.001 wt % to 0.500 wt % of one or more phosphorus-containing thermal stabilizers.

2. The composition according to claim 1, comprising
   A) 90.0 wt % to 97.5 wt % of aromatic polycarbonate,
   B) 1.0 to 2.5 wt % of interference pigment and/or pearlescent pigment comprising a titanium dioxide-coated mica,
   C) 0.02 wt % to ≤1 wt % of anhydride-modified α-olefin polymer.

3. The composition according to claim 1, comprising 1.2 to 2.0 wt % of interference pigment and/or pearlescent pigment comprising a titanium dioxide-coated mica.

4. The composition according to claim 1, wherein component D comprises one or more phosphites as thermal stabilizer.

5. The composition according to claim 1, wherein component D comprises
   i) phosphine, phosphite and phenolic antioxidant or
   ii) phosphine, phosphonite and phenolic antioxidant
   as phosphorus-containing thermal stabilizers.

6. The composition according to claim 1, wherein the thermal stabilizer present is bis(2,6-di-t-butyl-4-methylphenyl)pentaerythritol diphosphite.

7. The composition according to claim 1, wherein the anhydride-modified α-olefin polymer has an average molecular weight M$_w$, determined by means of gel permeation chromatography in ortho-dichlorobenzene at 150° C. with polystyrene calibration, of 1000 to 15 000 g/mol and an acid number of 45 to 170 mg KOH/g, determined according to DIN ISO 17025, by means of potentiometric titration.

8. The composition according to claim 1, wherein the composition has a melt volume flow rate (MVR) of 8 cm$^3$/(10 min) or less, determined according to ISO 1133:2012-03 at a testing temperature of 300° C. with a load of 1.2 kg.

9. A moulding produced from a composition according to claim 1.

10. The composition according to claim 1, wherein the composition comprises
    A) 90.0 wt % to 97.5 wt % of aromatic polycarbonate,
    B) 1.2 wt % to 2.0 wt %, of pearlescent pigment and/or interference pigment from the group of the titanium dioxide-coated micas,
    C) 0.2 wt % to ≤1 wt % of anhydride-modified α-olefin polymer, wherein the olefinic portion of the anhydride-modified α-olefin polymer has
    an ethylene content of 65.0-96.0 wt %,
    a propylene content of 2.0-10.0 wt % and
    a 1-octene content of 2.0-25.0 wt %,
    D) 0.05 to 0.270 wt % of phosphorus-containing thermal stabilizer comprising
       i) phosphine, phosphite and phenolic antioxidant or
       ii) phosphine, phosphonite and phenolic antioxidant,
    E) up to 7% by weight of further additives selected from the group consisting of flame retardants, anti-dripping agents, thermal stabilizers other than component D), impact modifiers, fillers, antistats, colourants, pigments other than component B, carbon black, lubricants, demoulding agents, hydrolysis stabilizers, compatibilizers, UV absorbers and/or IR absorbers.

11. The composition according to claim 10, wherein the composition consists of component A), B), C), D) and E).

12. The composition according to claim 10, wherein further additives optionally present according to component E are solely colourants, demoulding agents, thermal stabilizers other than component D and/or pigments other than component B.

13. A composition comprising:
    A) 50 wt% to 98.5 wt% of aromatic polycarbonate, having melt volume flow rate (MVR) of from 5 to 20 cm$^3$/(10 min) determined according to ISO 1133:2012-03 as a testing temperature of 300° C. with a load of 1.2 kg,
    B) 0.8 wt% to ≤ 3.0 wt% of interference pigment and/or pearlescent pigment comprising a titanium dioxide-coated mica;
    C) 0.05 wt% to ≤ 3 wt% of anhydride-modified olefin polymer, wherein the anhydride-modified olefin polymer has been modified with maleic anhydride and is based on polypropylene,
    and
    0.001 wt to 0.500 wt% of one or mroe phosphorus-containing thermal stabilizers.

* * * * *